(12) United States Patent
Chen et al.

(10) Patent No.: US 10,919,121 B2
(45) Date of Patent: Feb. 16, 2021

(54) MACHINING DEVICE

(71) Applicant: NATIONAL CHUNG HSING UNIVERSITY, Taichung (TW)

(72) Inventors: Jenq-Shyong Chen, Taichung (TW); Hao-Tang Wang, Taichung (TW)

(73) Assignee: NATIONAL CHUNG HSING UNIVERSITY, Taichung (TW)

( * ) Notice: Subject to any disclaimer, the term of this patent is extended or adjusted under 35 U.S.C. 154(b) by 460 days.

(21) Appl. No.: 15/792,244

(22) Filed: Oct. 24, 2017

(65) Prior Publication Data
US 2018/0178338 A1 Jun. 28, 2018

(30) Foreign Application Priority Data
Dec. 27, 2016 (TW) .............................. 105143266 A

(51) Int. Cl.
*B23Q 1/34* (2006.01)
*B23Q 5/04* (2006.01)
*B23B 37/00* (2006.01)
*B23Q 1/00* (2006.01)

(52) U.S. Cl.
CPC .............. *B23Q 5/043* (2013.01); *B23B 37/00* (2013.01); *B23Q 1/0009* (2013.01); *B23Q 1/34* (2013.01); *B23B 2260/108* (2013.01); *B23Q 2220/006* (2013.01); *B23Q 2240/00* (2013.01)

(58) Field of Classification Search
CPC ........ B23Q 5/043; B23Q 3/155; B23B 37/00; B23B 2260/108; B23D 79/00
USPC ........................................................ 173/213
See application file for complete search history.

(56) References Cited

FOREIGN PATENT DOCUMENTS

| CN | 104439348 A | * | 3/2015 |
| CN | 104439348 A | | 3/2015 |
| CN | 204658046 U | | 9/2015 |
| CN | 105171131 A | * | 12/2015 |
| CN | 105171131 A | | 12/2015 |
| CN | 105881758 A | | 8/2016 |
| DE | 102005011197 A1 | | 9/2006 |

* cited by examiner

*Primary Examiner* — Chelsea E Stinson
*Assistant Examiner* — Mary C Hibbert-Copeland
(74) *Attorney, Agent, or Firm* — Muncy, Geissler, Olds & Lowe, P.C.

(57) ABSTRACT

A machining device is adapted to be provided on a mount provided with a toolholder. The toolholder is controllable to rotate and is adapted to be engaged with a tool. A primary coil engaged with the toolholder includes a first ferrite core and a first coil assembly detachably engaged with the first ferrite core. The first coil assembly is modular molded, and is adhered to be an annular body having a first hollow portion. A piezoelectric actuator is electrically connected to the primary coil to drive the tool to vibrate. The secondary coil includes a second ferrite core and a second coil assembly detachably engaged with the second ferrite core. The second coil assembly is modular molded to be an annular body having a second hollow portion.

8 Claims, 7 Drawing Sheets

MACHINING DEVICE

BACKGROUND OF THE INVENTION

1. Technical Field

The present invention generally relates to a machining device, and more particularly to a machining device with vibration assisted machining function.

2. Description of Related Art

A conventional processing device with micro-vibration function is provided with a piezoelectric actuator on a high-speed rotating spindle, and the vibration generated by the piezoelectric actuator can be transmitted to a tool connected to an end of the spindle, whereby the tool can cut in a high-speed rotation with a micro vibration function at the same time. By changing the continuous contact processing into the reciprocating intermittent contact processing, the workpiece can obtain a high-precision smooth surface through the vibration processing. Said vibration processing is particularly suitable for high hardness or brittle materials, which can effectively improve the surface quality of the workpiece and reduce the roughness of the workpiece surface after processing.

The non-contact way of energy transmission has become a trend for vibration processing devices nowadays. However, it is known that a non-contact type vibration processing device has many drawbacks. For instance, an inductive structure for transmitting energy in the vibration processing device is bulky, and therefore tends to cause a great energy loss during the transmission. In addition, a non-contact power transmission device usually molds a ferrite core by powder metallurgy with ceramic materials as a medium for electromagnetic induction. If the ferrite core is designed to have a complicated geometrical shape, the ferrite core cannot be formed simply by the powder die-casting technology. For example, the conventional ferrite core 1 shown in FIG. 1, which has a flange 1a at each of two ends thereof, respectively, and has an annular groove 1b recessed into a body thereof, is too complicated to make solely through the powder die-casting technology. The semi-finished product has to take additional processing such as grinding and machining to form the structures of the flanges 1a and the annular groove 1b. However, the ceramic materials are brittle, so the ceramic materials are likely to break under an excessive external force, resulting in lower yield and higher manufacturing cost.

In addition, the conventional ferrite core 1 is installed on a spindle (not shown), which is rotated at high speed, to be rotated together. However, the conventional core 1 is large, and has high moment of inertia, which is likely to cause the spindle to oscillate while the spindle and the tool are rotating, resulting in low stability, which affects the precision of the processing.

Furthermore, said conventional ferrite core 1 has to match with a coil 2 to perform electromagnetic induction. However, as shown in FIG. 1, due to the restriction by the flanges 1a, it is necessary to wind the coil 2 around the conventional ferrite core 1 over and over again to achieve the induction performance, which is inconvenient for the assembling.

BRIEF SUMMARY OF THE INVENTION

In view of the reasons mentioned above, the primary objective of the present invention is to provide a machining device, which could be easily assembled and could cut production costs.

The present invention provides a machining device, which is adapted to be installed on a mount, wherein the mount is provided with a spindle and a toolholder provided on the spindle. The toolholder is controllable to rotate and is adapted to be engaged with a tool. The machining device includes a primary coil, a piezoelectric actuator, and at least one secondary coil. The primary coil includes a first ferrite core and a first coil assembly, wherein the first ferrite core is engaged with the toolholder. The first coil assembly is modular molded, and is detachably engaged with the first ferrite core. The first coil assembly has a first hollow portion which is adapted to be passed through by a part of the first ferrite core. The piezoelectric actuator is electrically connected to the primary coil and is engaged with the toolholder to be controlled to drive the tool to vibrate. The at least one secondary coil is adjacent to the primary coil, and includes a second ferrite core and a second coil assembly, wherein the second coil assembly is modular molded and is detachably engaged with the second ferrite core. The second coil assembly has a second hollow portion which is adapted to be passed through by a part of the second ferrite core.

With the aforementioned design, the machining device could provide low manufacturing cost, and could be easily installed.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
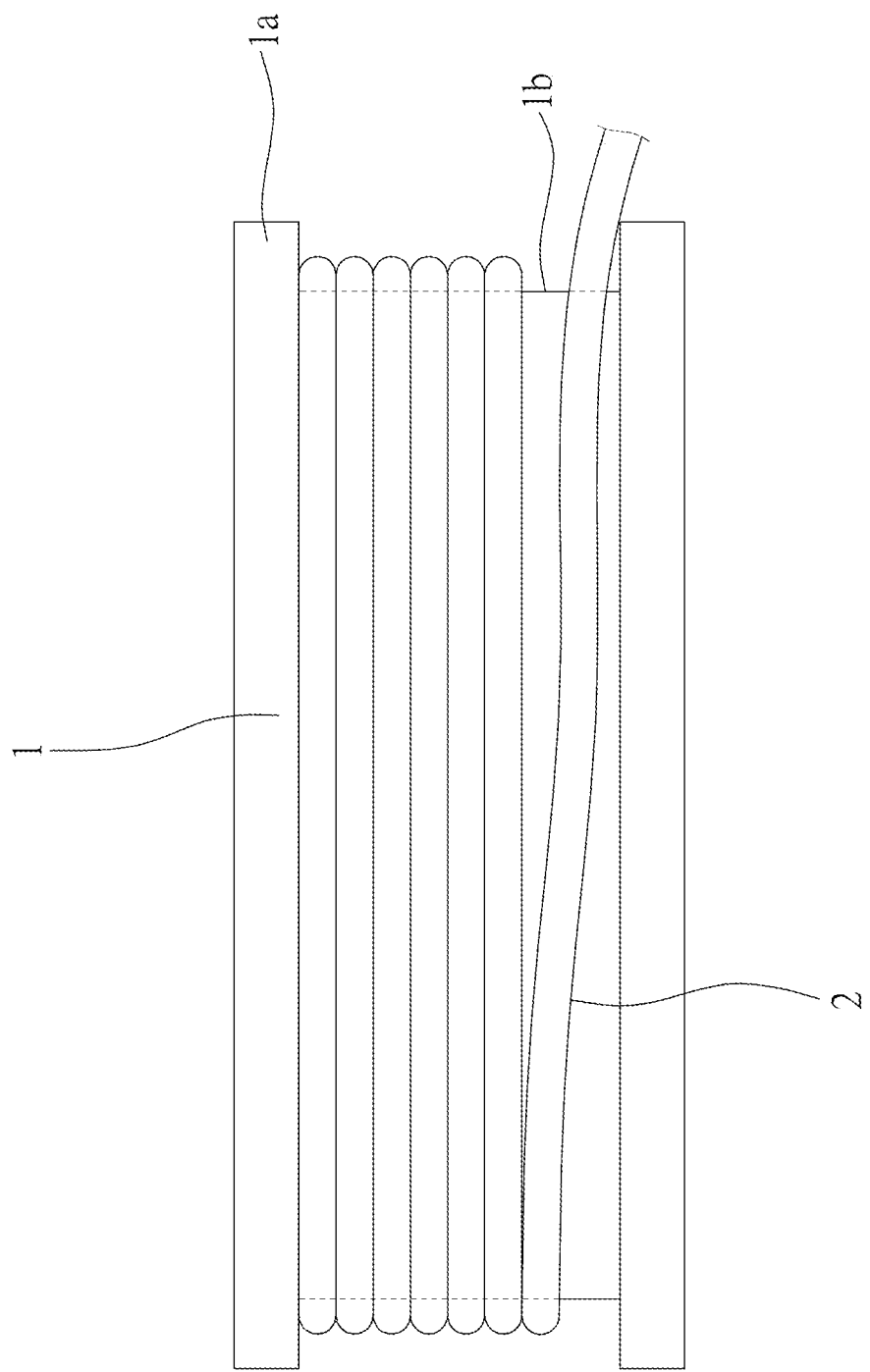
FIG. 1 is a schematic diagram of the conventional machining device, showing the electric cord winds around the ferrite core.
Figure 2:
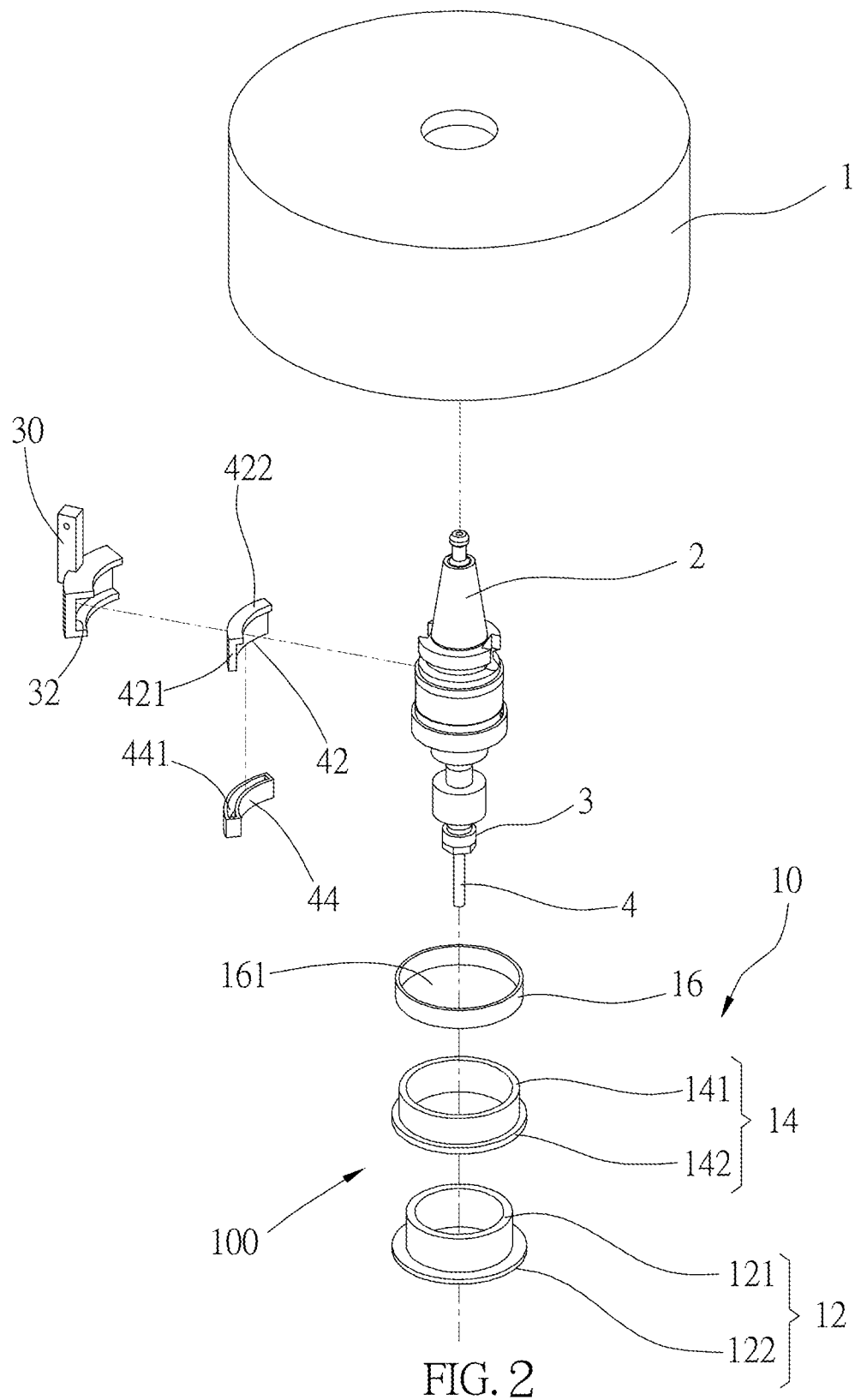
FIG. 2 is an exploded perspective view of the machining device of an embodiment of the present invention.
Figure 3:
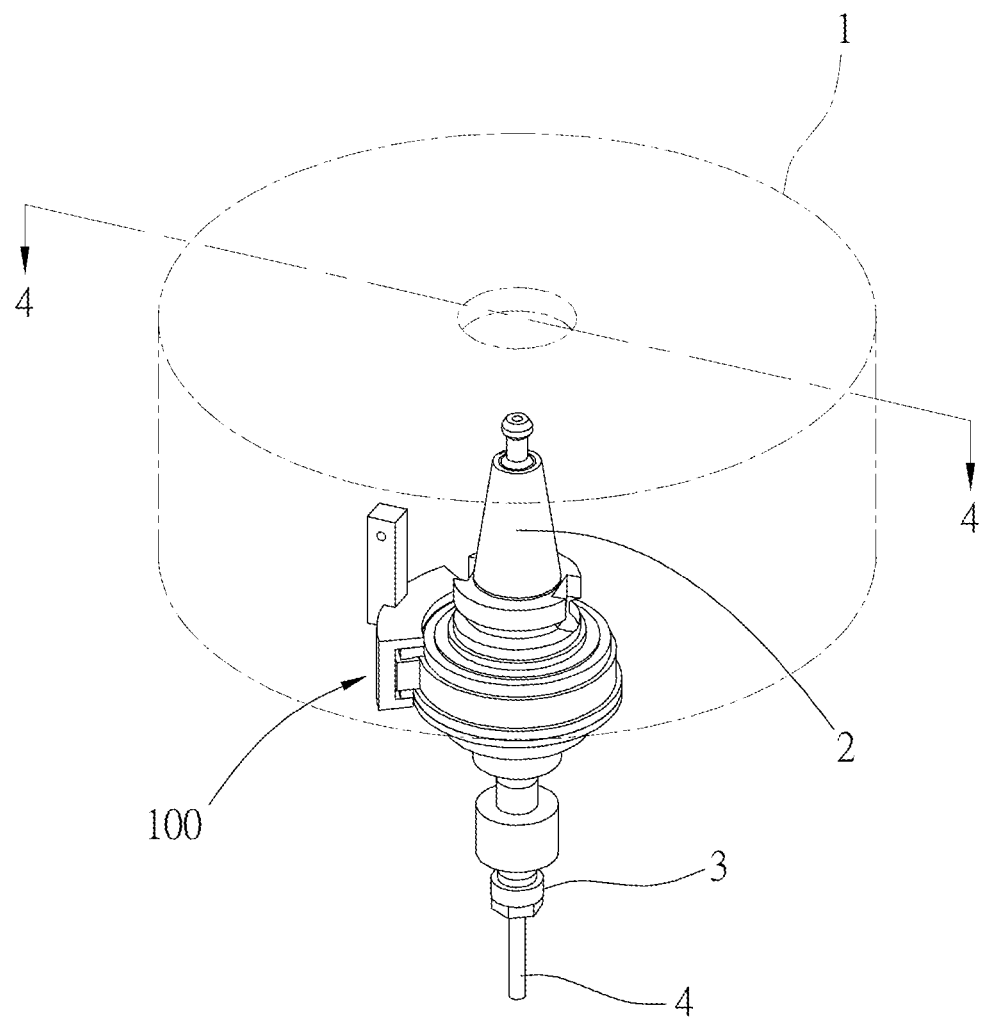
FIG. 3 is a perspective view of the machining device shown in FIG. 2.

A machining device 100 of an embodiment of the present invention is illustrated in FIG. 2 and FIG. 3, wherein the machining device 100 is adapted to be installed on a mount (not shown). In the current embodiment, the mount is a machine tool as an example, wherein the machine tool is provided with a spindle 1, a toolholder 2, and a chuck 3. The toolholder 2 is provided on the spindle 1, and is controllable to rotate. The chuck 3 is provided at a bottom end of the toolholder 2, and is adapted to be detachably engaged with a tool 4.

The machining device 100 includes a primary coil 10, a piezoelectric actuator 20, a saddle 30, and a secondary coil 40.

Figure 4:
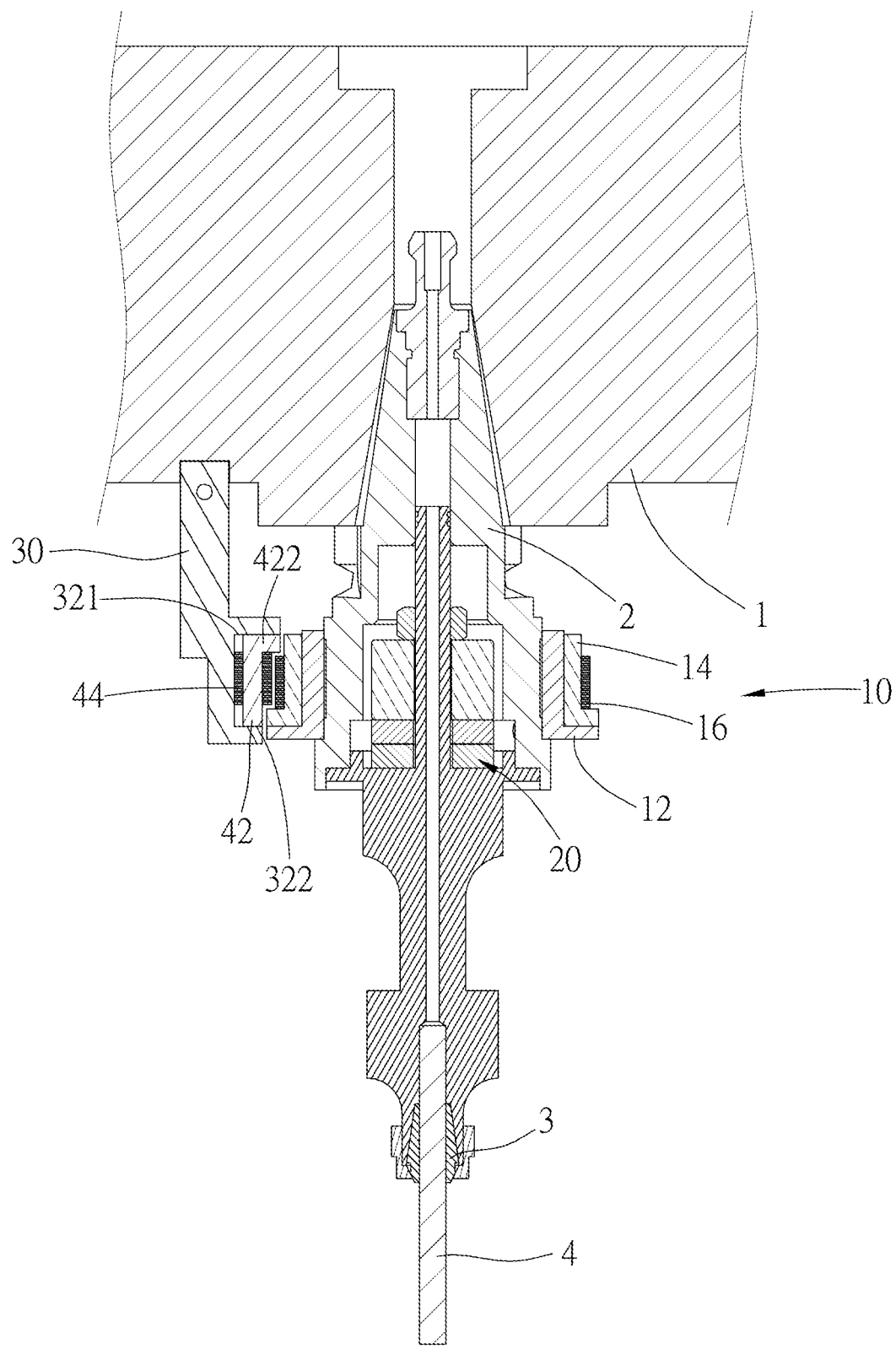
FIG. 4 is a sectional view along the 4-4 line of FIG. 3, showing the relations between the components of the machining device.
Figure 5:
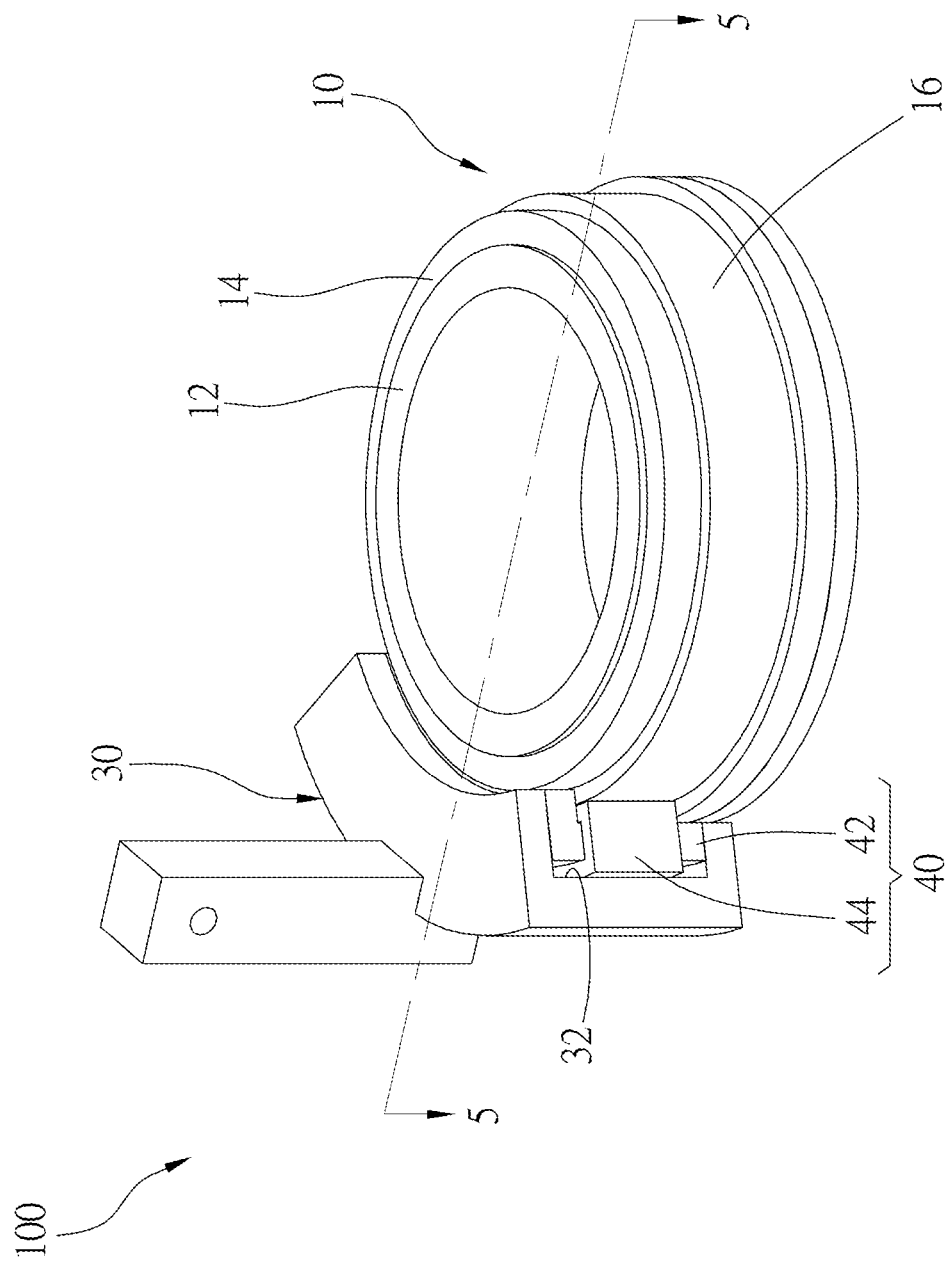
FIG. 5 is a perspective view, showing the primary coil and the secondary coil of the embodiment in FIG. 2.
Figure 6:
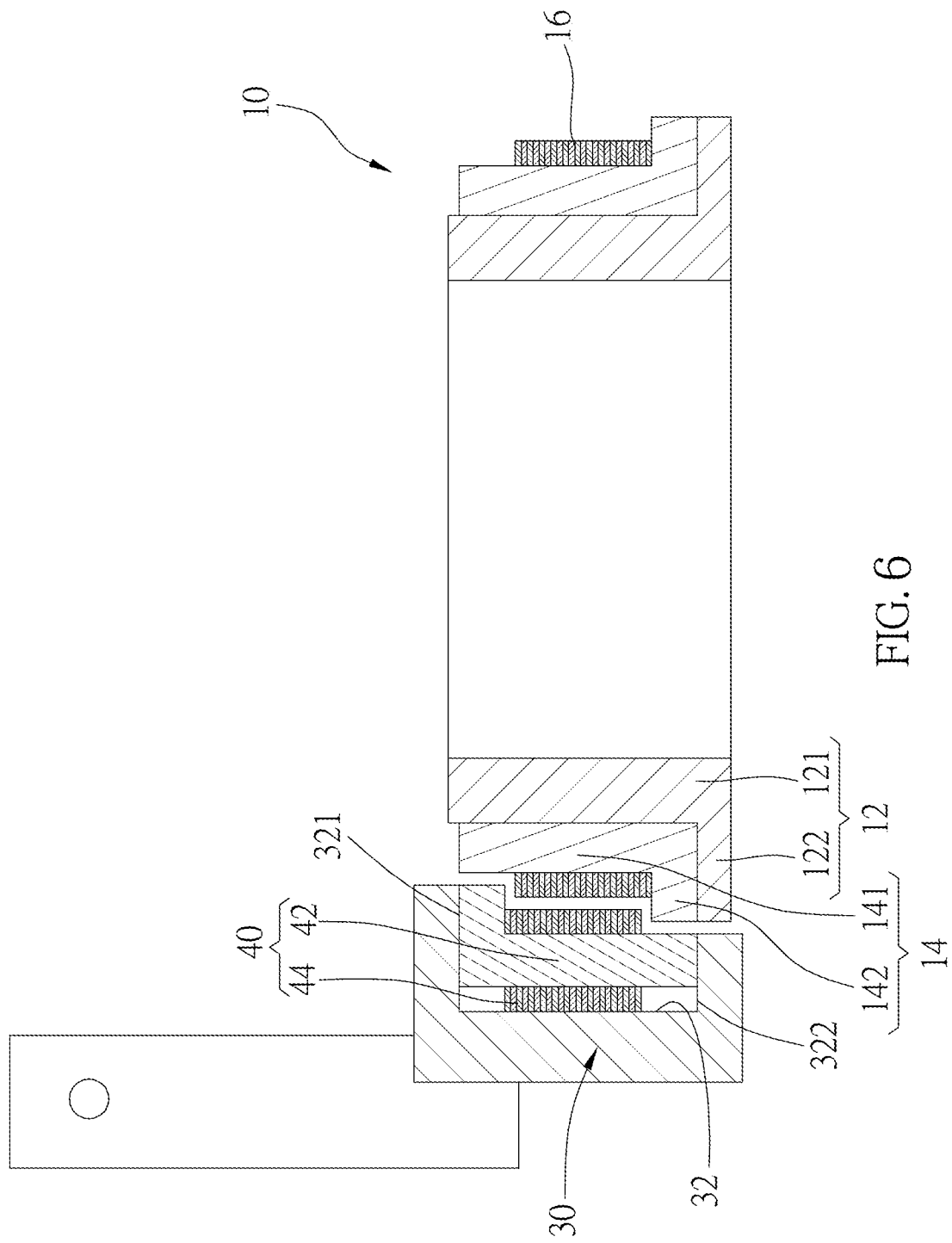
FIG. 6 is a sectional view along the 6-6 line of FIG. 5, showing the relations between the primary coil and the components of the secondary coil.

As shown in FIG. 4 to FIG. 6, the primary coil 10 includes a sleeve 12, a first ferrite core 14, and a first coil assembly 16, wherein the sleeve 12 is engaged with the toolholder 2, whereby the first ferrite core 14 and the first coil assembly 16 could rotate along with the toolholder 2. The sleeve 12 is made of material with low permeability such as gum, plastic, aluminum alloy, etc., and includes a first frame 121 and a first flange 122 extending outwardly from a bottom edge of the first frame 121 in a radial direction of the sleeve 12.

The first ferrite core 14 is made of magnetic material, with the characteristics of transmitting magnetic force, and is provided with a second frame 141 and a second flange 142 extending outwardly from a surface of the second frame 141 in a radial direction of the first ferrite core 14, wherein the second frame 141 is annular-shaped. The first ferrite core 14 is adapted to fit around the sleeve 12, whereby the second frame 141 of the first ferrite core 14 could surround an outside of the first frame 121 of the sleeve 12, and the second flange 142 could abut against the first flange 122 of the sleeve 12. A cross-section of the first ferrite core 14 is a symmetrical L-shape, wherein an overall structure of the first ferrite core 14 is simple and compact, and the first ferrite core 14 is produced by powder metallurgy with a ceramic material, without additional processing. In this way, the producing time of the first ferrite core 14 could be shortened, cutting manufacturing cost. In addition, the first ferrite core 14 has a small amount of internal porosity during the process of die-casting, whereby the first ferrite core 14 would be less likely to break.

Furthermore, since the first ferrite core 14 has a small volume, the first ferrite core 14 has lower moment of inertia, and the centrifugal force during high-speed rotation could be relatively reduced, and therefore, the first ferrite core 14 would not self-breaking easily during the rotation process. Also, the oscillations of the spindle 1, the toolholder 2, and the tool 4 causing by high moment of inertia of a conventional ferrite core could be improved, so that the spindle 1, the toolholder 2, and the tool 4 could stably rotate to effectively maintain a high processing precision.

Figure 7:
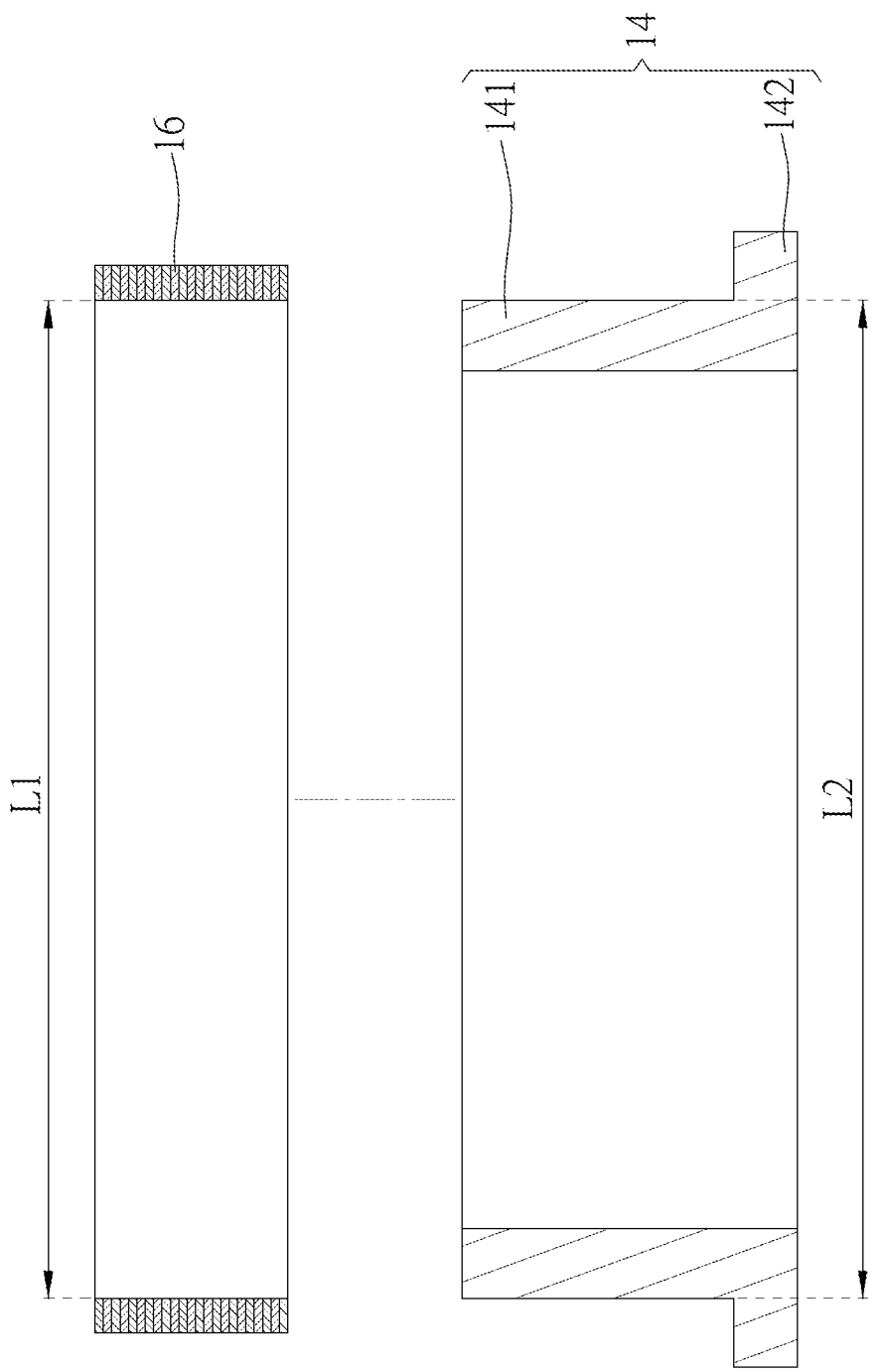
FIG. 7 is a schematic diagram, showing the molded first coil assembly detachably fits around the first ferrite core.

The first coil assembly 16 is modular molded, which is an annular body having a first hollow portion 161 in the middle, and is formed by winding an enameled wire coated with an insulating layer first, then adhering by applying an adhesive. The adhered first coil assembly 16 detachably fits around the first ferrite core 14, whereby the second frame 141 of the first ferrite core 14 would be passed through the first hollow portion 161, and an end of the first coil assembly 16 would abut against the second flange 142 of the first ferrite core 14. As shown in FIG. 7, an inner diameter L1 of the modular first coil assembly 16 is slightly greater than an outer diameter L2 of the second frame 141 of the first ferrite core 14, whereby the first coil assembly 16 could easily fit around the second frame 141 of the first ferrite core 14 during the assembling process.

As shown in FIG. 4, the piezoelectric actuator 20 is engaged with the toolholder 2 to be located between the tool 4 and the primary coil 10, and is electrically connected to the primary coil 10 to be controlled to drive the tool 4 to vibrate.

The saddle 30 is arc-shaped and is made of a material with low permitability, wherein an end of the saddle 30 is fixed on the spindle A recess 32 is recessed into a lateral surface of the saddle 30, and has an upper surface 321 and a lower surface 322, wherein the upper surface 321 is apart from the lower surface 322 by a distance.

The secondary coil 40 is electrically connected to a power (not shown) and is provided between the upper surface 321 and the lower surface 322 of the recess 32 to be fixed in a position close to the primary coil 10 without contacting with the primary coil 10. It is noted that, the engaging patterns and the engaging positions are not limited by the aforementioned design, as long as the primary coil 10 is apart from the secondary coil 40 by a distance. In other embodiment, the secondary coil 40 could be fixed in any position of the mount or other components.

The secondary coil 40 includes a second ferrite core 42 and a second coil assembly 44, wherein the second ferrite core 42 is arc-shaped, and a cross-section of the second ferrite core 42 is L-shaped. The second ferrite core 42 has a body 421 and a top margin 422 extending from a surface of the body 421. The second ferrite core 42 has the characteristics of the conductive magnetic field which is the same as that of the first ferrite core 14, and the second ferrite core 42 is formed in the same manner as the first ferrite core 14. Thus we are not going to describe in details herein.

The second coil assembly 44 is also modular molded, which is an annular body having a second hollow portion 441 in the middle, and is formed by winding an enameled wire coated with an insulating layer first, then adhering by applying an adhesive, which is formed in the same manner as the first coil group 16. It is worth mentioning that, the annular body of the second coil assembly 44 of the current embodiment is arc-shaped, and extends along a peripheral edge of the primary coil 10, so as to increase the area for induction to enhance the induction efficiency. However, the winding shape of the second coil assembly 44 is not limited by the aforementioned design. In other embodiment, the annular body of the second coil assembly 44 could be winded to be rectangular, annular, etc.

The adhered second coil assembly 44 is adapted to be detachably engaged with the second ferrite core 42. In other words, the second ferrite core 42 is provided in the second hollow portion 441 of the second coil assembly 44, whereby two ends of the second ferrite core 42 would extend out of the second coil assembly 44 to respectively abut against the upper surface 321 and the lower surface 322. In this way, the secondary coil 40 could be stably held by the saddle 30, preventing the secondary coil 40 from being disengaged. In the current embodiment, the primary coil 10 corresponds to single secondary coil 40. In other embodiment, the primary coil 10 could correspond to a plurality of secondary coils 40 providing around the peripheral edge of the primary coil 10, whereby to enhance the inductive performance.

With the aforementioned design, the first induction module 10 driven by the toolholder 2 could generate an electrical energy by a non-contact induction with the energized secondary coil 40, whereby to supply the electrical energy to the piezoelectric actuator 20. In this way, the tool 4 could be driven by the piezoelectric actuator 20 to cut in a vibration mode. In addition, when there is no need for vibration assisted machining, the toolholder 2 engaged with the primary coil 10 and the piezoelectric actuator 20 could be detached from the spindle 1 to be stored in the tool magazine. In this way, the toolholder 2 of the component which is provided with the machining device 100 could be replaced, which is convenient.

It is worth mentioning that, the first ferrite core 14 and the second ferrite core 42 of the current embodiment have simple and compact structures, and could respectively form an article having a small internal porosity by powder metallurgy process without additional processing, which provides high yield rate and effectively shortens the production time of the ferrite core.

Also, the purpose of the aforementioned molding of the coil assembly is to allow first coil assembly 16 and the second coil assembly 44 to be mass-produced in a standard process in advance, whereby the adhered coil assembly could be easily engaged with the corresponding ferrite core during the assembling process, i.e., the first coil assembly 16 fits around the first ferrite core 14, and the second coil assembly 44 fits around the second ferrite core 42, which is different from the conventional assembly process (i.e., winding the coil 2 around the conventional ferrite core over and over again). The design of the first coil assembly 16 and the second coil assembly 44 greatly enhance the assembling efficiency.

It must be pointed out that the embodiments described above are only some preferred embodiments of the present invention. All equivalent structures which employ the concepts disclosed in this specification and the appended claims should fall within the scope of the present invention.

What is claimed is:

1. A machining device, which is adapted to be installed on a mount, wherein the mount is provided with a spindle and a toolholder provided on the spindle; the toolholder is controllable to rotate and is adapted to be engaged with a tool; the machining device comprising:
   a primary coil module comprising a first ferrite core and a first coil, wherein the first ferrite core is engaged with the toolholder; the first coil is modular molded, and is detachably engaged with the first ferrite core; the first coil has a first hollow portion which is adapted to be passed through by a part of the first ferrite core;
   a piezoelectric actuator which is electrically connected to the primary coil module and is engaged with the toolholder to be controlled to drive the tool to vibrate; and
   at least one secondary coil module which is adjacent to the primary coil module, and comprises a second ferrite core and a second coil, wherein the second coil is modular molded and is detachably engaged with the second ferrite core; the second coil has a second hollow portion which is adapted to be passed through by a part of the second ferrite core;
   wherein the first ferrite core is provided with a second frame and a second flange extending outwardly from a surface of the second frame in a radial direction of the first ferrite core; the first coil is engaged with an outside of the second frame, and an end of the first coil abuts against the second flange;
   wherein the primary coil module comprises a sleeve fitting around the toolholder; the sleeve comprises a first frame and a first flange connected to a bottom edge of the first frame; the second frame of the first ferrite core fits around an outside of the first frame, and the second flange of the first ferrite core abuts against the first flange.

2. The machining device of claim 1, wherein an inner diameter of the first coil is slightly greater than an outer diameter of the second frame of the first ferrite core.

3. The machining device of claim 1, further comprising a saddle fixed on the spindle; the secondary coil module is disposed on the saddle.

4. The machining device of claim 3, wherein the saddle has an upper surface and a lower surface, and the upper surface is apart from the lower surface by a distance; the secondary coil unit is provided between the upper surface and the lower surface.

5. The machining device of claim 4, wherein two ends of the second ferrite core extend out of the second coil.

6. The machining device of claim 5, wherein the two ends of the second ferrite core respectively abut against the upper surface and the lower surface.

7. The machining device of claim 1, wherein at least one or both of the first coil and the second coil comprises an enameled wire; the enameled wire is shaped by adhering.

8. The machining device of claim 1, wherein the at least one secondary coil module comprises a plurality of secondary coil modules, which are respectively disposed along a peripheral edge of the primary coil module.

* * * * *